United States Patent [19]

Houdek et al.

[11] Patent Number: 4,903,194
[45] Date of Patent: Feb. 20, 1990

[54] STORAGE ADDRESSING ERROR DETECTION CIRCUITRY

[75] Inventors: Merle E. Houdek; David O. Lewis, both of Rochester, Minn.

[73] Assignee: International Business Machines Corporation, Armonk, N.Y.

[21] Appl. No.: 119,756

[22] Filed: Nov. 12, 1987

[51] Int. Cl.$^4$ ............................................. G06F 12/00
[52] U.S. Cl. .................. 364/200; 364/265.3; 364/246.7; 364/969.1
[58] Field of Search ... 364/200 MS File, 900 MS File

[56] References Cited

U.S. PATENT DOCUMENTS

| | | | |
|---|---|---|---|
| 3,970,999 | 7/1976 | Elward | 340/172.5 |
| 4,340,933 | 7/1982 | Miu et al. | 364/200 |
| 4,524,427 | 6/1985 | Vidalin et al. | 364/900 |
| 4,545,016 | 1/1983 | Berger | 364/200 |
| 4,742,447 | 5/1988 | Duvall et al. | 364/200 |
| 4,747,044 | 5/1988 | Schmidt et al. | 364/200 |
| 4,750,177 | 6/1988 | Hendrie et al. | 364/200 |
| 4,751,703 | 6/1988 | Picon et al. | 364/200 |

Primary Examiner—Gareth D. Shaw
Assistant Examiner—Gopal C. Ray
Attorney, Agent, or Firm—Bradley A. Forrest

[57] ABSTRACT

Storage addressing error detection circuitry detects addressing errors in a computer system during data transfers between an I/O unit and main storage where main storage has logical boundaries which if crossed can cause destruction of data. The central processing unit (CPU) of the computer system furnishes the I/O unit the starting address for the data transfer and thereafter the I/O unit furnishes addresses for completion of the data transfer. The starting address contains a hash value related to the logical boundaries. Each time the I/O unit presents an address with a hash value for a data transfer another hash value is generated from the remainder of the address passed by the I/O unit. If the two hash values do not compare equal, a logical boundary in main storage would be crossed and to prevent such an occurrence the storage operation is inhibited and an error signal is sent to the I/O unit which then terminates the data transfer. A write to a read only storage area is also detected as a storage addressing error. A write hash is a read hash inverted. The read hash would not compare equal to the write hash and an error signal would be generated and sent to the I/O unit if the I/O unit were attempting to write into a read only storage area.

14 Claims, 2 Drawing Sheets

STORAGE ADDRESSING ERROR DETECTION CIRCUITRY

TECHNICAL FIELD

This invention relates to storage addressing error detection and more particularly to storage addressing error detection where Input/Output (I/O) addressing errors are detected when the I/O device controls the use of main storage addressing.

BACKGROUND ART

In some past computer systems and particularly ones having virtual storage addressing, the central processing unit (CPU) would utilize virtual storage addresses which were converted or translated to real storage addresses for addressing real main storage. The virtual addresses are or appear to be sequential, but the real main storage is structured into pages having a fixed number of bytes where the pages may or may not be sequential in main storage. Hence, if the translation of the virtual storage address resulted in a real storage address which crosses a page boundary, a wrongful storage location could be addressed whereby data at that location could be destroyed without the ability to recover. The data base and code space in main storage could be destroyed.

In such computer systems it was essential to have means for determining if a page boundary were crossed so that the virtual storage address could be re-translated to a real main storage address for the correct page. In those computer systems the CPU handled main storage addressing for both the CPU and the I/O functions. Part of the address translation process included a check to determine if a page boundary were crossed, and as previously explained, if one were crossed the virtual address was re-translated.

Because the I/O units were unable to operate on the real main storage addresses, they were prevented from destroying the data base or code space in real main storage. Although the I/O units could increment or decrement the virtual storage addresses in a manner to cause a page crossing, such would be detected by the CPU during the translation process and a re-translation would take place to provide the correct real main storage address.

In computer systems incorporating the present invention, the I/O units control their own use of main storage addressing. The I/O units work with real main storage addresses. Thus, the page crossing detection means of past computer systems are not useable. The CPU with this arrangement is not tied up during the I/O data transfer operation, which is a benefit, but also has no way of checking if the real addresses used for the I/O data transfers resulted in page crossings.

Typically, in computer systems incorporating the present invention, the CPU will send an I/O unit a command together with several real main storage addresses which the I/O unit then utilizes during data transfer, read or write, as the result of executing the command. After each data transfer, the I/O unit increments or decrements the real main storage address it has been working with until it is necessary to use the next real main storage address which had been furnished to it with the command from the CPU. This action continues until the command is completely executed, and if no error occurs, all of the real main storage addresses furnished with the command will have been used.

It is the incrementing or decrementing of the real main storage addresses by the I/O units which could result in a page crossing. As previously indicated, any undetected page crossing can result in destruction of the data base or the code space. The I/O unit would no longer be working with the real main storage space assigned to it and the damage is unpredictable. Hence, error recovery would be very difficult if not impossible. The need for detection of use of wrong real main storage addresses by the I/O units is accentuated when the I/O units do not have checking schemes such as parity predict logic in their main storage address calculation means.

The present invention thus is particularly useful in computer systems where the I/O units use real main storage addresses for data transfers and where the number of bytes which can be transferred exceed the number of bytes in a page of storage. The present invention is also useful for storage read protect. This permits sharing of areas in storage. For example, an area in storage may be designated as a read only area. Any write operations to this read only area will be prevented and a storage addressing error will be indicated by the present invention.

SUMMARY OF THE INVENTION

The principal object of the present invention is to provide an improved storage addressing error detection mechanism and particularly one which permits usage of consecutive main storage addresses up to a predetermined number i.e. where virtual equals real main storage; one which allows usage of non consecutive pages having a fixed number of bytes, i.e. virtual equals virtual; one which provides detection of virtual equals virtual page crossings; one which provides detection of a write to main storage in an area designated as read only; and one which provides detection of randomly generated main storage addresses.

The present invention utilizes spare bits in the real main storage addresses which are passed by the CPU to the I/O units along with the command. The real main storage addresses are larger than the amount of real main storage. For example, there are four spare bits in a thirty two bit address which addresses a maximum of two hundred fifty six mega bytes of main storage. These spare bits are encodeable for use in storage addressing error detection. The CPU when it sends real storage addresses with the command to an I/O unit, the real storage addresses include hash bits in the spare bit positions. These hash bits are generated by the CPU during the address translation process of translating virtual storage addresses to real storage addresses. These hash bits are included in the real main storage addresses sent to the I/O unit receiving the command. When that I/O unit is ready to do a data transfer, it transfers a real main storage address with the hash bits into the address register of a storage control unit which is commonly connected to both the CPU and the I/O bus serving the I/O units. The non hash bits of the real storage addresses sent to the storage control unit are applied to a hash generator and the resulting hash bits are compared with the hash bits in the address register. If the two sets of hash bits do not compare equal, a page boundary has been crossed and the I/O unit is notified of the occurrence by an error signal. The I/O unit then terminates the data transfer operation.

DETAILED DESCRIPTION OF THE INVENTION

Figure 1:
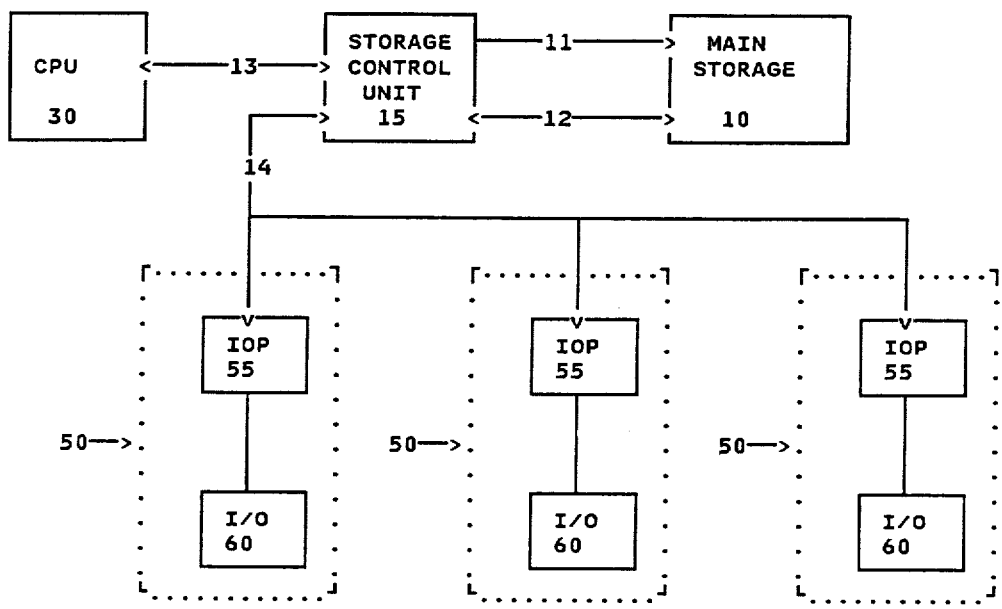
FIG. 1 is a schematic block diagram of a computer system incorporating the present invention; and, FIG. 2 is a schematic diagram showing only the logical elements of the computer system of FIG. 1 which are pertinent to the present invention.

With reference to the drawings and particularly to FIG. 1 the invention is shown by way of example as being incorporated into a computer system having a main storage 10, a storage control unit 15, a CPU 30 and I/O units 50, each including an I/O processor (IOP) 55 and an I/O device 60. The storage control unit 15 is connected to storage 10 by an address bus 11 and a data bus 12. The CPU 30 connects to the storage control unit 15 by means of CPU bus 13. In this example the CPU 30 communicates with the I/O units 50 via the storage control unit 15. The I/O units 50 are connected to the storage control unit by means of an I/O bus 14.

Figure 2:
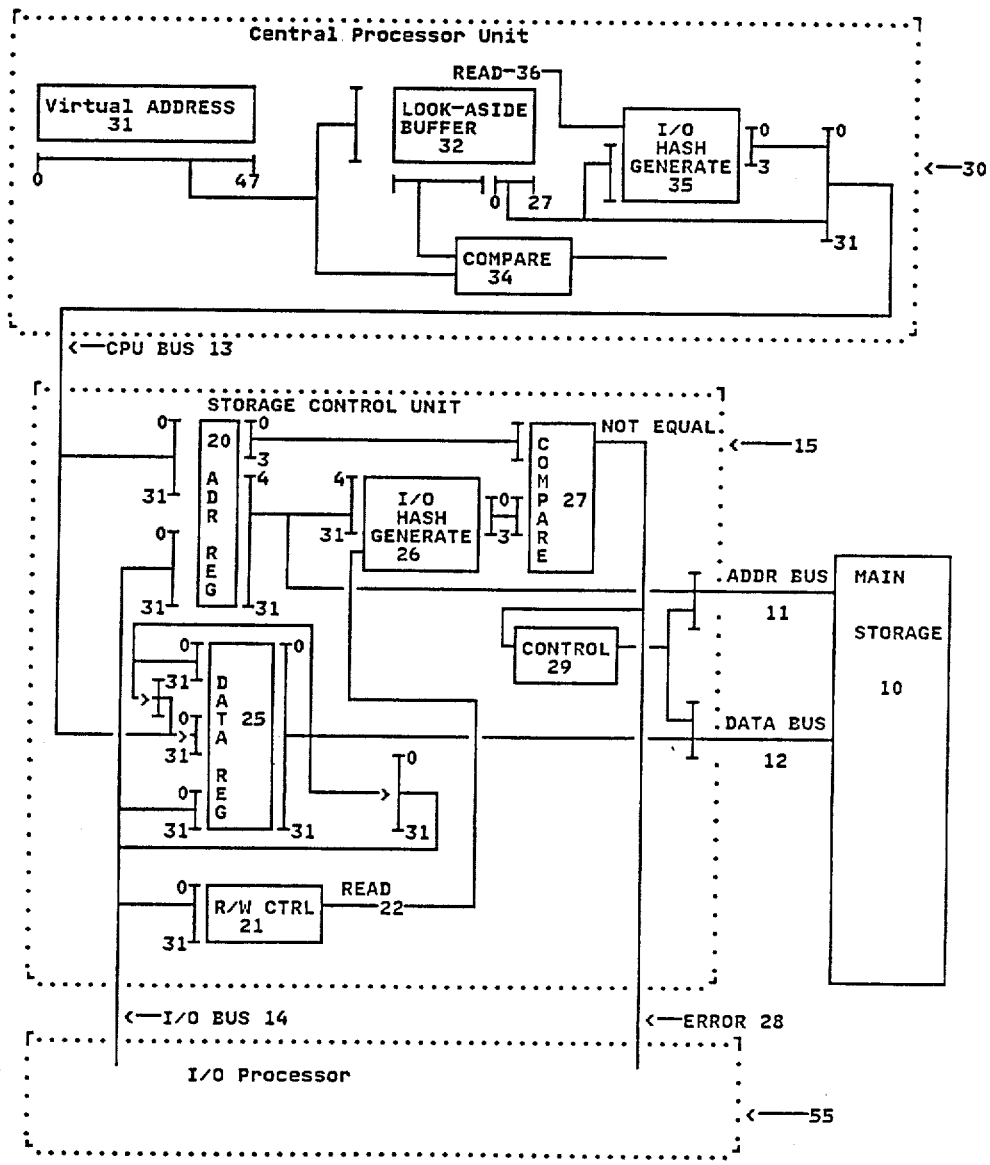

The CPU 30 references main storage 10 by means of a virtual address and in this instance a six byte virtual address where a byte consists of eight bits. Virtual storage is divided into a number of segments and each segment is divided into pages of a fixed size. The virtual storage address is larger than the real storage address because it addresses a larger storage space. Main storage 10 is divided into page frames which have the same size as the pages of virtual storage. Pages are loaded into the main storage page frames from a programs address space. In order to access main storage 10 the virtual address in virtual address register 31 of CPU 30, FIG. 2, is translated to a real storage address.

A look-aside buffer 32 and compare logic 34 are connected to the virtual address register 31 and perform the translation of a virtual address to a real address. If the virtual address in register 31 is found in the look-aside buffer 32 as determined by the compare logic 34 a real storage address of twenty eight bits is gated to I/O hash generate logic 35 and to the CPU bus 13. The I/O hash generate logic 35 generates a four bit I/O hash which is concatenated with the twenty eight bits on CPU bus 13 to form a thirty two bit main storage address. In order to provide for read protect of read only storage areas the hash bits are inverted if the I/O command is a write command. Hence, the I/O generate logic 35 has an input on line 36 indicating an I/O read command.

This thirty two bit address is sent over CPU bus 13 to data register 25 in storage control unit 15 when the CPU 30 is sending an I/O unit 50 addresses as part of the I/O command . The thirty two bit address is then gated from the register 25 to I/O bus 14 which transmits it to the IOP 55 having received the command.

When the commanded I/O unit 50 is ready to transfer data to or from main storage 10, the IOP 55 places a real main storage address on bus 14 for transmission into address register 20 of the storage control unit 15. The low order twenty eight bits of the address in register 20 are gated into I/O hash generate logic 26 which generates a four bit hash. The type of I/O command sent to an I/O device is sent by the commanded I/O device via I/O bus 14 to read/write control R/W CTRL 21. If the command is a read command a READ signal is passed on line 22 to I/O hash generate logic 26. I/O hash generate logic 26 then generates a four bit hash, but if the command is a WRITE command, I/O hash generate logic generates a four bit hash which, except for the high order bit is inverted, i.e. the three low order hash bits are the inverted form of the corresponding three low order hash bits for a read operation.

The I/O hash generate logic 26 and 35 consist of Exclusive OR logic elements arranged to perform an exclusive OR logical operation on selected bits of the real storage address. Address bit a0, the high order bit, determines which of two addressing modes are used, i.e. a boundary designation. In this example, the two modes are a 512 byte page crossing and a 64k byte boundary crossing. When bit a0 equals one (a0=1) the address being used is virtual equals real (V=R). This means that the low order 16 bits of the address are not checked for validity because a V=R address can cross boundaries up to 64k bytes, but any incrementing or decrementing across a 64k byte boundary causes an error indication. When bit a0 equals zero (a0=0) the address being used is virtual equals virtual (V=V). This means that the low order 9 bits of the address are not checked but any incrementing or decrementing across a 512 byte boundary causes an error indication. All occurrences of main storage being altered when the address is marked as read only by means of the address hash bits a1, a2, and a3 are detected. When a read from storage is performed either a read hash or a write hash is allowed to be used with the rest of the address. This is because the I/O unit may have to read part of a page before returning a response. When performing a store or write, only the write hash is allowed. Otherwise an error is indicated to the I/O unit and the main storage write is terminated. If a random main storage address is generated during a fetch or read from main storage, there is a three out of four chance of detecting the error. If such an address is generated during a write to main storage, there is a seven out of eight chance of detecting the error.

A hash is generated from the address bits such that h1,h2,h3=H(a4 ... a31). When a page crossing occurs, the address bits change from Af=a4,a5,a6, . . . ai, 0,1,1,1,1,1, ... to At=a4,a5,a6, ... , ai, 1,0,0,0,0,0, ... when the address is incremented or from Af=a4,a5,a6, ..., ai,1,0,0,0,0,0, ... to At=a4,a5,a6, ... , ai,0,1,1,1,1,1, ... when the address is decremented . This is valid for 3<i<22 for 512 byte page crossing mode or for 3<i<15 for the 64k boundary crossing mode. The transition from Af to At is equivalent to At=Af x or T where T=0,0,0, . . . ,0,1,1,1,1,1, . . . Generating the hash of the page crossing address results in H(At)=-H(Af xor T) or H(At)=H(Af) xor H(T). If the hash of T were all zeros, then the hash of At would be the same as the hash of Af and a page crossing would go undetected. In order to make the hash of At different from the hash of Af, the hash of T must not be all zeros for all values of 3<i<22 in the 512 byte page crossing mode and 3<i<15 in the 64k boundary crossing mode.

In order to distinguish between a read hash and a write hash, the write hash is formed by inverting all of the bits of the read hash. A read into main storage must detect page crossings whether a read hash or a write hash was used. If a read occurs with a write hash then H(T) must not result in all ones because the inverted value of all ones is all zeros and would go undetected. Therefore H(T) must not result in all ones or all zeros.

A hash algorithm can be generated by selecting address bits to be exclusively ored together such that H(T) is not all ones or all zeros for any value of i. The process starts at the highest value of i and proceeds to the smallest value of i. At each value of i, one or more bits of the hash must be selected that ai is exclusive ored into. For the 512 byte mode the operation is started at address bit a22 which is arbitrarily selected to be exclusively ored into bit h2. At this point T=0000 0000 0000 0000 0000 0011 1111 1111 and for a22, H(T)=0,1,0. It should be noted that address bit a21 can not be exclusively ored with h2 because H(T) would equal 0,0,0, and the page crossing would go undetected. Therefore, hash bits h1 or h3 are candidates. For h1, H(T)=1,1,0. However, for address bit a20, h3 yields H(T)=1,1,1 and this page crossing would go undetected. Thus for a20, h2 is selected and the result is H(T)=1,0,0. Using this process the hash algorithm for the 512 byte page crossing mode becomes:

```
address              1         2         3
bit          01234567890123456789012345678901
hash-h1              x  x  x  x  x  x
hash-h2           x  x  x  x  x  x  xx
hash-h3         xx x  x  x  x  x
cumulative h1    000111000111000110
xor from   h2    110001110001100011
right      h3    101100011100011000
```

Inspecting the hash bits it is noted that there is no instance where the cumulative xor for the hash for any one address bit is all ones or all zeros. Hence, all 512 byte page crossings are detected with this algorithm.

In a similar manner the algorithm for the 64k boundary crossing is:

```
address              1         2         3
bit          01234567890123456789012345678901
hash-h1              x  x  x  x
hash-h2           x  x  x  xx
hash-h3         xx x  x  x
cumulative h1    000111000111
xor from   h2    110001110001
right      h3    101100011100
```

In order to detect an address with all zeros, two bits are inverted and the read hash becomes:

a1,a2,a3 = h1 (not h2), (not h3).

In order to distinguish between a read hash and a write hash, the write hash is formed as follows:
a1,a2,a3 = (not h1),h2,h3.

The algorithms can be stated as follows:
For reads the 512 byte page crossing detection is:

a0 = 0 a1 = xor (a6,a9,a12,a15,a18,a21)

a2 = not xor (a5,a8,a11,a14,a17,a20,a22)

a3 = not xor (a4,a5,a7,a10,a13,a16,a19)

and the 64k byte boundary crossing detection is:

a0 = 1 a1 = xor (a6,a9,a12,a15)

a2 = not xor (a5,a8,a11,a14,a15)

a3 = not xor (a4,a5,a7,a10,a13)

For writes, the hash bits a1,a2,a3 are formed by inverting the corresponding read hash bits.

The I/O hash bits from the I/O generate logic 26 are compared with the high order hash bits in the address register 20 by compare logic 27 which for example can be logical and circuits. If the generated hash bits do not compare with the hash bits from the address register 20, an error condition exists and a signal noting that condition is sent to the I/O unit over line 28. This indicates to the IOP that the address sent for the data transfer was invalid. Consequently the data transfer operation is ended. Note that the hash bits by this arrangement not only are used for detecting a boundary crossing error, but enable detection of a WRITE to a READ only area in storage as a storage addressing error.

If the I/O hash bits from the I/O generate logic 26 compare equal with the hash bits from the address register 20, control 29 gates the address on buss 11 for addressing main storage 10. Control 29 has sufficient logic to perform all of the control functions for the storage control unit 15. So far as the present invention is concerned control 29 would only require an inverter and a logical AND circuit, whereby in the absence of a not equal condition or error, the address is gated from register 20 onto bus 11. If there is a not equal condition, the inverter would inhibit the logical AND circuit and the address would not be gated onto buss 11.

When there is an equal condition, the IOP 55 places the function to be performed on I/O bus 14 and if the function is a store operation, the IOP 55 also sends the data to be stored.

It should be noted that a single I/O hash generate circuit could be used . In such an embodiment the CPU would send the real main storage address into the address register of storage control unit 15. Hash generate circuit 26 would generate the hash which would then be concatenated with the remaining address bits and entered into the data register 25 for passage to an I/O unit.

From the foregoing it is seen that the invention provides for storage addressing error detection where the I/O units control their own main storage addressing. It is also seen that two different addressing boundary modes can be used by the I/O units with storage addressing error detection. It is also seen that a write to a read only area in storage is detected as an addressing error.

While the invention has been described in terms of one embodiment with a few variations also described, it is recognized by those skilled in the art that the invention is not limited to such embodiments and variations. Substitutions could be made without departing from the spirit and scope of the invention as described and claimed.

What is claimed is:

1. Storage addressing error detection circuitry for detecting addressing errors in a computer system during data transfers between an I/O unit and main storage, where a central processing unit (CPU) provides the I/O unit with starting storage addresses for the data transfers and said I/O unit provides storage addresses for the remainder of the data transfer, said storage having logical boundaries, said starting storage addresses containing hash values related to said main storage boundaries, the improvement comprising:
   means in said CPU for generating hash values for said starting storage addresses,
   means for transferring starting storage addresses and hash values contained therein to said I/O unit, register means connected to receive and store storage addresses from said I/O unit including the hash values contained therein, hash generate means connected to receive the non hash portions of storage addresses from said register means and generate hash values from said non hash portions of storage addresses, and compare means connected to compare hash values from said register means with hash values from said hash generate means and for transmitting an error signal to said I/O unit if a hash value from said hash generate means compares unequal with a hash value from said register means.

2. The storage addressing error detection circuitry of claim 1 where said hash generate means generates an inverted hash value when the storage operation is a write to storage.

3. The storage addressing error detection circuitry of claim 1 where said main storage has two different types of logical boundaries and said starting address includes an indication as to which type of boundary is related to said hash value in the starting address.

4. The storage addressing error detection circuitry of claim 3 where one type of logical boundary is 512 byte pages of storage.

5. The storage addressing error detection circuitry of claim 3 where a second type of logical boundary is 64k bytes of storage.

6. Storage addressing error detection circuitry for a computer system including an addressable storage having at least one crossable logical boundary, a storage control unit connected to said storage and having an address register, a data register and control means for controlling the passing of an address from said address register to said storage, a central processing unit (CPU) having a CFU bus connected to said address and data registers of said storage control unit and having at least address register means for temporarily storing storage addresses, at least one I/O unit having an I/O bus connected to said address and data registers of said storage control unit, the improvement comprising:

first hash generating means in said CPU for generating a hash value related to said logical boundary from addresses in said address register means and connected to said CPU bus for placing hash values thereon for transfer along with addresses from said address register means to said data register of said storage control unit to enable retrieval therefrom by said I/O unit, second hash generating means in said storage control unit for generating second hash values from non hash value portions of addresses entered into said address register of said storage control unit by said I/O unit, and error checking means connected to compare hash values in addresses entered into said address register of said storage control unit by said I/O unit with second hash values generated by said second hash generating means for generating an error signal for said I/O unit when a hash value in an address entered into said address register of said storage control unit by said I/O unit does not compare equal with a second hash value generated from that address.

7. The storage addressing error detection circuitry of claim 6 where said error signal also inhibits the passage of an address from said storage control unit to said storage.

8. The storage addressing error detection circuitry of claim 6 where said first and second hash generating means generate inverted hash values when the storage operation is a write to storage operation.

9. In a computer system having an addressable main storage with at least one logical boundary therewithin, a storage control unit with at least an address register, a data register, and control means for controlling the passage of addresses to said main storage, a central processing unit (CPU) with at least address register means for temporarily storing main storage addresses and a CPU bus connecting said address register means to said address and data registers of said storage control unit, an I/O unit having at least an I/O bus connected to said address and data registers of said storage control unit, the improvement comprising:

first I/O hash generate means connected to receive storage addresses from said address register means in said CPU to generate a hash value related to said boundary in said main storage and connected to concatenate said hash value with an address from said address register means and make said concatenated hash value and main storage address available to said I/O unit by entering said concatenated hash value and storage address into said data register of said storage control unit, second I/O hash generate means connected to said address register of said storage control unit to receive storage addresses therefrom and generate hash values, and error checking means connected to receive the hash value concatenated with a storage address from said I/O unit and entered into said address register of said storage control unit and compare it with hash values generated by said second I/O hash generate means and to generate an error signal when the comparison is unequal.

10. The computer system of claim 9 where said first and second hash generate means generate an inverted hash value when the storage operation is a storage write operation.

11. In a computer system having an addressable main storage with a plurality of logical boundaries therewithin, a storage control unit with at least an address register, a data register, and control means for controlling the passage of addresses to said main storage, a central processing unit (CPU) with at least address register means for temporarily storing main storage addresses and a CPU bus connecting said address register means to said address and data registers of said storage control unit, an I/O unit having at least an I/O bus connected to said address and data registers of said storage control unit, the improvement comprising:

I/O hash generate means for generating hash values related to said logical boundaries, said I/O hash generate means being operable to generate hash values from addresses in said address register means for concatenation with those addresses where the concatenated hash value and address are entered into said data register of said storage control unit for transfer to said I/O unit and for generating hash-values from the address portion of concatenated hash values and addresses entered into said address register of said storage control unit from said I/O unit, and error checking means for comparing the hash value concatenated with an addresses in said address register with the hash value generated by said I/O hash generate means from the address portion of the concatenated hash value and address in said address register and for generating an error signal upon an unequal comparison.

12. The computer system of claim 11 where one of said boundaries is a 512 byte page boundary.

13. The computer system of claim 11 where another of said boundaries is a 64k byte boundary.

14. The computer system of claim 11 where said I/O hash generate means generates an inverted hash value when the storage operation is a write to storage operation.

* * * * *